(12) United States Patent
Chen et al.

(10) Patent No.: US 11,436,289 B2
(45) Date of Patent: Sep. 6, 2022

(54) INFORMATION RECOMMENDATION METHOD AND APPARATUS, AND ELECTRONIC DEVICE

(71) Applicant: SUZHOU DEEPLEAPER INFORMATION AND TECHNOLOGY COMPANY LIMITED, Jiangsu (CN)

(72) Inventors: Yingxiang Chen, Jiangsu (CN); Fenglei Wang, Jiangsu (CN); Dongjun Li, Jiangsu (CN)

(73) Assignee: SUZHOU DEEPLEPER INFORMATION AND TECHNOLOGY COMPANY LIMITED, Jiangsu (CN)

( * ) Notice: Subject to any disclaimer, the term of this patent is extended or adjusted under 35 U.S.C. 154(b) by 0 days.

(21) Appl. No.: 16/629,560

(22) PCT Filed: Nov. 22, 2019

(86) PCT No.: PCT/CN2019/120290
§ 371 (c)(1),
(2) Date: Jan. 8, 2020

(87) PCT Pub. No.: WO2021/082123
PCT Pub. Date: May 6, 2021

(65) Prior Publication Data
US 2022/0253491 A1   Aug. 11, 2022

(30) Foreign Application Priority Data

Oct. 28, 2019   (CN) .......................... 201911032556.8

(51) Int. Cl.
*G06F 16/245*       (2019.01)
*G06F 16/901*       (2019.01)
(Continued)

(52) U.S. Cl.
CPC ........ *G06F 16/9535* (2019.01); *G06F 16/245* (2019.01); *G06F 16/9024* (2019.01); *G06F 16/9538* (2019.01); *G06F 17/40* (2013.01)

(58) Field of Classification Search
CPC ............... G06F 16/9535; G06F 16/245; G06F 16/9024; G06F 16/9538; G06F 17/40
See application file for complete search history.

(56) References Cited

U.S. PATENT DOCUMENTS 7,512,612 B1 *   3/2009   Akella ................ G06F 16/9024
8,326,847 B2   12/2012   Balmin et al.
(Continued)

FOREIGN PATENT DOCUMENTS

CN   104462084 A   3/2015
CN   105912630 A   8/2016
(Continued)

*Primary Examiner* — Jorge A Casanova
(74) *Attorney, Agent, or Firm* — Yu Gang (57) ABSTRACT

An information recommendation method and apparatus, and an electronic device are provided. The method includes: a retrieval relation graph is constructed, and the retrieval relation graph includes multiple sub-retrieval relation graphs corresponding to search results obtained by using different keywords, and each sub-retrieval relation graph includes at least one connected directed edge and the at least one connected directed edge is configured to indicate a linked page node obtained by keyword search; target keywords to be retrieved are received; linked page nodes corresponding to the target keywords and a weight value of each linked page node are queried from the retrieval relation graph to determine a target search list, and the target search list includes multiple recommendation information sorted by weight values; and the target search list is displayed.

7 Claims, 3 Drawing Sheets

(51) Int. Cl.
*G06F 16/9535* (2019.01)
*G06F 16/9538* (2019.01)
*G06F 17/40* (2006.01)

(56) References Cited

U.S. PATENT DOCUMENTS

| | | | |
|---|---|---|---|
| 9,430,584 B2* | 8/2016 | Wang | G06F 16/90324 |
| 9,787,705 B1* | 10/2017 | Love | G06F 16/9024 |
| 10,331,706 B1* | 6/2019 | Yakhnenko | G06F 16/30 |
| 10,585,903 B2* | 3/2020 | Chin | G06F 16/9535 |
| 2009/0248661 A1* | 10/2009 | Bilenko | G06F 16/951 |
| | | | 707/999.005 |
| 2010/0125572 A1* | 5/2010 | Poblete | G06F 16/9535 |
| | | | 707/E17.014 |
| 2011/0270861 A1* | 11/2011 | Arshavsky | G06F 16/24534 |
| | | | 707/769 |
| 2015/0081656 A1* | 3/2015 | Wang | G06F 16/90324 |
| | | | 707/706 |
| 2018/0052884 A1* | 2/2018 | Kale | G06F 16/242 |
| 2020/0074322 A1* | 3/2020 | Chungapalli | H04N 21/4662 |

FOREIGN PATENT DOCUMENTS

| | | |
|---|---|---|
| CN | 106570046 A | 4/2017 |
| CN | 108829865 A | 11/2018 |
| JP | 2009251845 A | 10/2009 |
| WO | 2012160693 A1 | 11/2012 |

* cited by examiner

INFORMATION RECOMMENDATION METHOD AND APPARATUS, AND ELECTRONIC DEVICE

CROSS-REFERENCE TO RELATED APPLICATIONS

The present disclosure claims benefit of Chinese Patent Priority No. 201911032556.8, filed to the China Patent Office on Oct. 28, 2019, entitled "Information Recommendation Method and Apparatus, and Electronic Device", and the contents of which are hereby incorporated by reference in its entirety.

TECHNICAL FIELD

The present disclosure relates to the technical field of information processing, and in particular to an information recommendation method and apparatus, and an electronic device.

BACKGROUND

In the related art, with the development of an Internet, users are increasingly relying on search engines to obtain information. Due to different levels of user knowledge and different understandings of search targets, users may obtain contents to be required through a longer path. Therefore, major search engines provide relevant search entries, and provide search queries (namely recommended keywords) related to the contents searched by users for users to choose. A common search method provided in the related art includes the following steps. First, at least one core word is extracted from a search query inputted by a user. Second, search queries that include the at least one core word are extracted from a platform and these search queries are considered as a candidate set of a related search list. Third, weighted summation is performed on a total frequency of recent searches for each word in the candidate set and a degree of correlation between each word and the search query of the user to obtain a score for each word, and words are taken as recommended content of related searches in a descending order of scores.

However, although this kind of recommendation for related search takes into account a historical search frequency of the user and the relevance between historical search and the search query of the user, it ignores that when the user cannot clearly describe the content to be searched, adjectives, question-and-answer queries, or words that are slightly related to search purposes are more frequently used. After extracting query keywords in such a way, the keywords are likely to be inconsistent with a true search intention of the user and cannot accurately capture the search intention of the user.

As to above-mentioned problem, no effective solution has been provided yet.

SUMMARY

At least some embodiments of the present disclosure provide an information recommendation method and apparatus, and an electronic device, so as at least to partially solve a technical problem of a large recommendation error due to a fact that a search intention of a user cannot be accurately captured during information recommendation in the related art.

In an embodiment of the present disclosure, an information recommendation method is provided, which may include that: a retrieval relation graph is constructed, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search; target keywords to be retrieved are received; linked page nodes corresponding to the target keywords and a weight value of each linked page node are queried from the retrieval relation graph to determine a target search list, and the target search list includes multiple recommendation information sorted by weight values; and the target search list is displayed.

Optionally, the operation that the retrieval relation graph is constructed may include that: historical search information is acquired, and the historical search information records session control sheets corresponding to each user from the start of the search to the end of the search during a history process; each session control sheet is extracted from the historical search information to determine the multiple sub-retrieval relation graphs; the multiple sub-retrieval relation graphs are synthesized to obtain a sub-retrieval relation graph set; and, the multiple sub-retrieval relation graphs in the sub-retrieval relation graph set are combined according to an association of keywords to obtain the retrieval relation graph.

Optionally, the operation that each session control sheet is extracted from the historical search information to determine the multiple sub-retrieval relation graphs may include that: search keywords and clicked pages recorded from the start of the search to the end of the search in each of the session control sheets are extracted; a directed edge between the search keywords is established with a time series as a reference, and a link identifier of a clicked page corresponding to each search keyword is assigned; and each sub-retrieval relation graph is established by using the directed edges and the link identifiers to obtain the multiple sub-retrieval relation graphs.

Optionally, the operation that each session control sheet is extracted from the historical search information may include that: a start time point and an end time point of each session control sheet, and an initial search keyword corresponding to the start time point and an end search keyword corresponding to the end time point are determined; and each session control sheet in the historical search information is cut according to the initial search keyword and the end search keyword.

Optionally, the operation that the multiple sub-retrieval relation graphs are combined according to the association of keywords to obtain the retrieval relation graph may include that: each directed edge of each sub-retrieval relation graph is determined; the determined directed edges are de-duplicated to obtain the processed directed edges; the processed directed edges are combined according to the association of keywords to obtain the combined directed edges; and the combined directed edges are normalized to obtain the retrieval relation graph.

Optionally, after constructing the retrieval relation graph, the method may further include that: a weight of each search keyword is preprocessed by a preset page ranking algorithm, and the preset page ranking algorithm at least includes: a PageRank algorithm; and the weight value of each linked page node is determined according to the weight of each search keyword and a content of a linked page.

Optionally, the operation that the target search list is determined may include that: linked page nodes corresponding to the target keywords are searched from the retrieval relation graph; a weight value of each linked page node is queried; the linked page nodes corresponding to the target keywords are sorted according to the weight value of each linked page node; and recommended keywords, or recommended sentences, or recommended keywords and recommended sentences corresponding to each linked page node are queried to obtain the recommended information, so as to determine the target search list.

In another embodiment of the present disclosure, an information recommendation apparatus is also provided, which may include: a construction element, configured to construct a retrieval relation graph, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search; a receiving element, configured to receive target keywords to be retrieved; a determination element, configured to query linked page nodes corresponding to the target keywords and a weight value of each linked page node from the retrieval relation graph to determine a target search list, where the target search list includes multiple recommendation information sorted by weight values; and a display element, configured to display the target search list.

Optionally, the construction element may include: a first acquisition component, configured to acquire historical search information, and the historical search information records session control sheets corresponding to each user from the start of the search to the end of the search during a history process; a first extraction component, configured to extract each session control sheet from the historical search information to determine the multiple sub-retrieval relation graphs; a synthesizing component, configured to synthesize the multiple sub-retrieval relation graphs to obtain a sub-retrieval relation graph set; and a first combination component, configured to combine, according to an association of keywords, the multiple sub-retrieval relation graphs in the sub-retrieval relation graph set to obtain the retrieval relation graph.

Optionally, the first extraction component may include: a first extraction sub-component, configured to extract search keywords and clicked pages recorded from the start of the search to the end of the search in each of the session control sheets; a first establishment sub-component, configured to establish, with a time series as a reference, a directed edge between the search keywords, and assign a link identifier of a clicked page corresponding to each search keyword; and a second establishment sub-component, configured to establish each sub-retrieval relation graph by using the directed edges and the link identifiers to obtain the multiple sub-retrieval relation graphs.

Optionally, the first extraction component may further include: a first determination sub-component, configured to determine a start time point and an end time point of each session control sheet, and an initial search keyword corresponding to the start time point and an end search keyword corresponding to the end time point; and a cutting sub-component, configured to cut each session control sheet in the historical search information according to the initial search keyword and the end search keyword.

Optionally, the first combination component may include: a second determination sub-component, configured to determine each directed edge of each sub-retrieval relation graph, and de-duplicate the directed edges to obtain the processed directed edges; a first combination sub-component, configured to combine the processed directed edges according to the association of keywords to obtain the combined directed edges; and a normalization component, configured to normalize the combined directed edges to obtain the retrieval relation graph.

Optionally, the information recommendation apparatus may further include: a preprocessing element, configured to preprocess, after constructing a retrieval relation graph, a weight of each search keyword by a preset page ranking algorithm, and the preset page ranking algorithm at least includes: a PageRank algorithm; and a first determination component, configured to determine the weight value of each linked page node according to the weight of each search keyword and a content of a linked page.

Optionally, the determination element may be configured to: search for linked page nodes corresponding to the target keywords from the retrieval relation graph; query a weight value of each linked page node; sort the linked page nodes corresponding to the target keywords according to the weight value of each linked page node; and recommended keywords, or recommended sentences, or query recommended keywords and recommended sentences corresponding to each linked page node to obtain the recommended information, so as to determine the target search list.

In another embodiment of the present disclosure, an electronic device is also provided, which may include: a processor; and a memory, configured to store an executable instruction of the processor, and the processor is configured to perform the information recommendation method as mentioned above by executing the executable instruction.

In another embodiment of the present disclosure, a storage medium is also provided, which may include a stored program, and when running the stored program, a device where the storage medium is located may be controlled to perform the information recommendation method as mentioned above.

In the at least some embodiments of the present disclosure, a retrieval relation graph is first constructed, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search; target keywords to be retrieved are received; then, linked page nodes corresponding to the target keywords and a weight value of each linked page node are queried from the retrieval relation graph to determine a target search list, where the target search list includes multiple recommendation information sorted by weight values; and finally, the target search list may be displayed. Through above mentioned embodiments, according to the same understanding of a user for a certain field, in making related search recommendations, a relationship between a search behavior sequence of the user and the intention of the user is considered, a historical search behavior sequence is used for obtaining true search intentions of historical users, and true search intentions of new users when searching for a query are inferred according to these historical behaviors, thereby shortening the search path of users, and improving user experience. Moreover, a weight value is used for determining a search list to be recommended, so that users can view the most wanted information, so as to solve the technical problem of the large recommendation error due to the fact that the search intention of the user cannot be accurately captured during information recommendation in the related art.

BRIEF DESCRIPTION OF THE DRAWINGS

The accompanying drawings described herein are used for providing a further understanding of the present disclosure, and constitute a part of the application, and the exemplary embodiments of the present disclosure and the description thereof are used to explain the present disclosure, but do not constitute improper limitations to the present disclosure. In the drawings.

DETAILED DESCRIPTION

In order to make those skilled in the art better understand the solution of the present disclosure, the technical solutions in the embodiments of the present disclosure will be clearly and completely described herein below with the drawings in the embodiments of the present disclosure. It is apparent that the described embodiments are part of the embodiments of the present disclosure, not of the embodiments. According to the embodiments of the present disclosure, other embodiments obtained on the premise of no creative work of those of ordinary skill in the art should fall within the scope of protection of the present disclosure.

It is to be noted that the specification and claims of the present disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

The following embodiments of the present disclosure may be applied to various search engines, search recommendation boxes, extended search word purchase in SEO, and other scenarios. After a user inputs keywords, or sentences, or files into an input box, corresponding recommendation list information may be pushed. The user is allowed to quickly find the required content, which more closely matches the search intention of the user, thereby improving the search efficiency.

Although the search behaviors and purposes of users on the Internet are different, and in a given field, the levels of user's understanding of the field are different, the process of user's understanding of the field is similar, so when a user encounters a problem that needs to be solved by a search engine, before that, there is a high probability that other users have encountered the same problem that have been solved by the search engine. At least some embodiments of the present disclosure adopt this analysis mode to query the required recommendation information.

In an embodiment of the present disclosure, an information recommendation method is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

Figure 1:
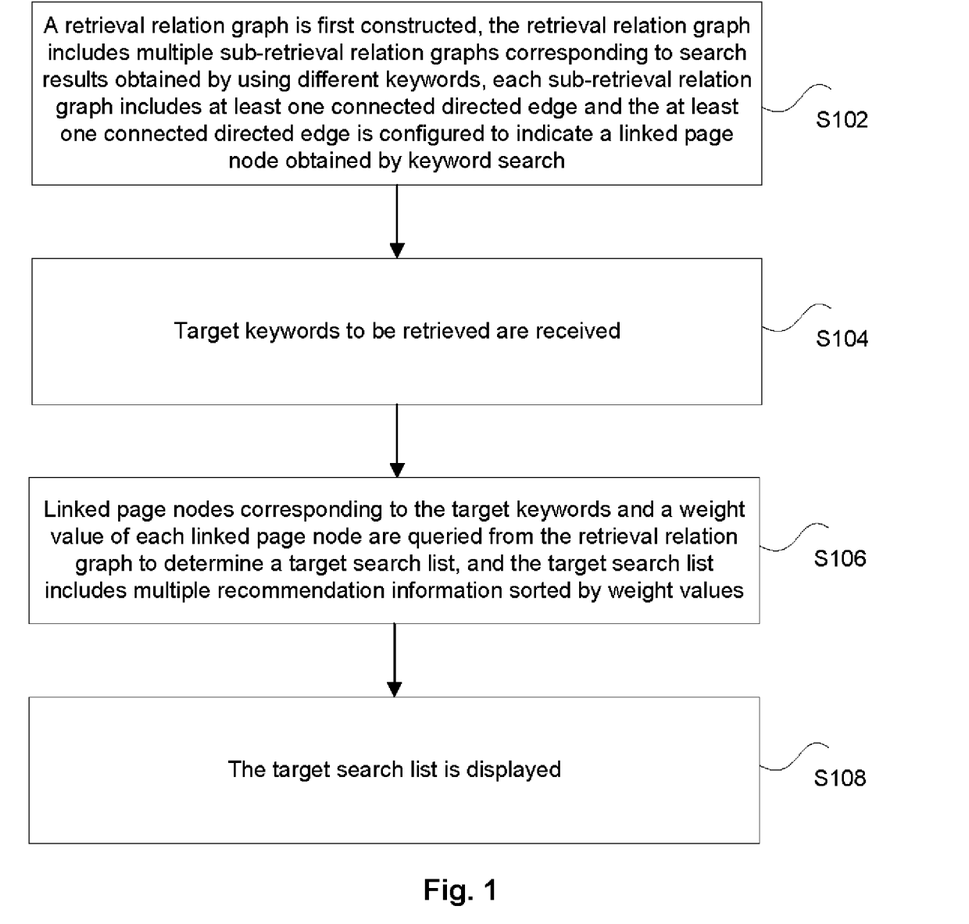
FIG. 1 is a flowchart of an information recommendation method according to an optional embodiment of the present disclosure.

FIG. 1 is a flowchart of an information recommendation method according to an optional embodiment of the present disclosure. As shown in FIG. 1, the method includes the following steps.

At step S102, a retrieval relation graph is first constructed, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search.

At step S104, target keywords to be retrieved are received.

At step S106, linked page nodes corresponding to the target keywords and a weight value of each linked page node are queried from the retrieval relation graph to determine a target search list, and the target search list includes multiple recommendation information sorted by weight values.

At step S108, the target search list is displayed.

By means of the above steps, a retrieval relation graph is first constructed, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search; target keywords to be retrieved are received; then, linked page nodes corresponding to the target keywords and a weight value of each linked page node are queried in the retrieval relation graph to determine a target search list, and the target search list includes multiple recommendation information sorted by weight values; and finally, the target search list may be displayed. In this embodiment, according to the same understanding of a user for a certain field, in making related search recommendations, a relationship between a search behavior sequence of the user and the intention of the user is considered, a historical search behavior sequence is used to obtain true search intentions of historical users, and true search intentions of new users when searching for a query are inferred according to these historical behaviors, thereby shortening the search path of users, and improving user experience. Moreover, a weight value is used for determining a search list to be recommended, so that users can view the most wanted information, so as to solve the technical problem of the large recommendation error due to the fact that the search intention of the user cannot be accurately captured during information recommendation in the related art.

The following describes the embodiments of the present disclosure in detail with reference to each step.

In some embodiments of the present disclosure, the retrieval relation graph is defined as G. Through the retrieval relation graph, subsequent nodes corresponding to input target keywords and the weight of each node may be retrieved, thereby determining a keyword sequence to be recommended.

At step S102, the retrieval relation graph is first constructed, the retrieval relation graph includes multiple sub-retrieval relation graphs corresponding to search results obtained by using different keywords, each sub-retrieval relation graph includes at least one connected directed edge and the at least one connected directed edge is configured to indicate the linked page node obtained by keyword search.

Optionally, the operation that a retrieval relation graph is constructed includes that: historical search information is acquired, and the historical search information records session control sheets corresponding to each user from the start of the search to the end of the search during a history process; each session control sheet is extracted from the historical search information to determine the multiple sub-retrieval relation graphs; the multiple sub-retrieval relation graphs are synthesized to obtain a sub-retrieval relation graph set; and the multiple sub-retrieval relation graphs in the sub-retrieval relation graph set are combined according to an association of keywords to obtain the retrieval relation graph.

In some embodiments of the present disclosure, a session control sheet may be defined as a session. This session is defined as a process where the user enters the search engine once, searches continuously on the search engine and exits from the search engine until the problem is solved. Then, each time the user searches in a session, it is an increase of information for the user. The later search behavior is closer to the user's real needs, so the user information increases more, until the last query is found, the information about the user is acquired completely, and the user exits from the search engine. Therefore, it can be understood that in a session, the query that is searched first is a pavement for the query that is searched later, and is the clue to find the query that is later searched. The query that is searched later is the intention obtained by the user through the previous search behavior. Therefore, in the recommendation of related search lists, the query that is searched later should be given a higher weight.

In some embodiments of the present disclosure, the operation that each session control sheet in the historical search information is extracted to determine the multiple sub-retrieval relation graphs includes that: search keywords and clicked pages recorded from the start of the search to the end of the search in each of the session control sheets are extracted; a directed edge between the search keywords is established with a time series as a reference, and a link identifier of a clicked page corresponding to each search keyword is assigned; and each sub-retrieval relation graph is established by using the directed edges and the link identifiers to obtain the multiple sub-retrieval relation graphs.

Optionally, the operation that each session control sheet is extracted from the historical search information includes that: a start time point and an end time point of each session control sheet, and an initial search keyword corresponding to the start time point and an end search keyword corresponding to the end time point are determined; and each session control sheet in the historical search information is cut according to the initial search keyword and the end search keyword.

That is, after extracting the search behaviors of users, the historical search information may be divided into multiple sessions according to the start of the user search and the end of the user search.

In some embodiments of the present disclosure, the operation that the multiple sub-retrieval relation graphs are combined according to the association of keywords to obtain the retrieval relation graph includes that: each directed edge of each sub-retrieval relation graph is determined; the determined directed edges are de-duplicated to obtain the processed directed edges; the processed directed edges are combined according to the association of keywords to obtain the combined directed edges; and the combined directed edges are normalized to obtain the retrieval relation graph.

That is, for each session, a sub-retrieval relation graph may be extracted to obtain a sub-retrieval relation graph set, and the relation graphs of each session may be combined to obtain G.

Optionally, after constructing the retrieval relation graph, the method further includes that: a weight of each search keyword is preprocessed by a preset page ranking algorithm, and the preset page ranking algorithm at least includes: a PageRank algorithm; and the weight value of each linked page node is determined according to the weight of each search keyword and a content of a linked page.

In the recommendation of the related search list, the weight of each search query may be preprocessed by a PageRank algorithm. For example, for each session $S=[q_1, q_2, \ldots, q_n]$ searched by the user, for any i, i<j, $q_i$ and $q_j$ are connected to make a directed edge, and the edge weight is v (i, j), so that the retrieval relation graph may be constructed according to the session. In this way, for sessions of users, the sub-relation graphs constructed by each session may be combined to obtain a query relation graph G (U, V). And G is a directed graph, U is a set of nodes in the graph, each node represents a query, the number of nodes is de-duplicated queries searched by users, V is a set of edges in the graph. The edges in the graph are a union of the edges of each sub-relation graph, an edge weight of each edge is the sum of edge weights of the corresponding start and end points in sub-graphs, and the value is normalized according to the start point.

At step S104, target keywords to be retrieved are received.

At step S106, linked page nodes corresponding to the target keywords and the weight value of each linked page node are queried from the retrieval relation graph to determine the target search list, and the target search list includes multiple recommendation information sorted by weight values.

As an optional embodiment of the present disclosure, the operation that the target search list is determined includes that: linked page nodes corresponding to the target keywords are searched from the retrieval relation graph; a weight value of each linked page node is queried; the linked page nodes corresponding to the target keywords are sorted according to the weight value of each linked page node; and recommended keywords, or recommended sentences, or recommended keywords and recommended sentences corresponding to each linked page node are queried to obtain the recommended information, so as to determine the target search list.

After constructing the query relation graph G, the weight of each query is obtained using the PageRank algorithm. A higher weight means a higher probability that the user can obtain useful information. When generating a recommendation list of related searches, assuming that the search query of the user at this time is q, the successors of q are searched in G, and sorted in a descending order of weight.

The above weight value may be set by the user, and a suitable value may be set according to different use environments.

At step S108, the target search list is displayed.

For example, a user A searched for two sessions: Session1: ["Who writes only two lines? Lyric", "Zhaoyuan, Hong", "Interesting", "Ziyu, Wang"], Session2: ["National Custom Beautiful Boy", "Jingyi, Ju"].

A user B searched for a session: ["Zhaoyuan, Hong", "Zhaoyuan, Hong Original Singer"].

A user C searched for a session: ["Jingyi, Ju", "Zhaoyuan, Hong", "Tanyunxi"].

Figure 2:
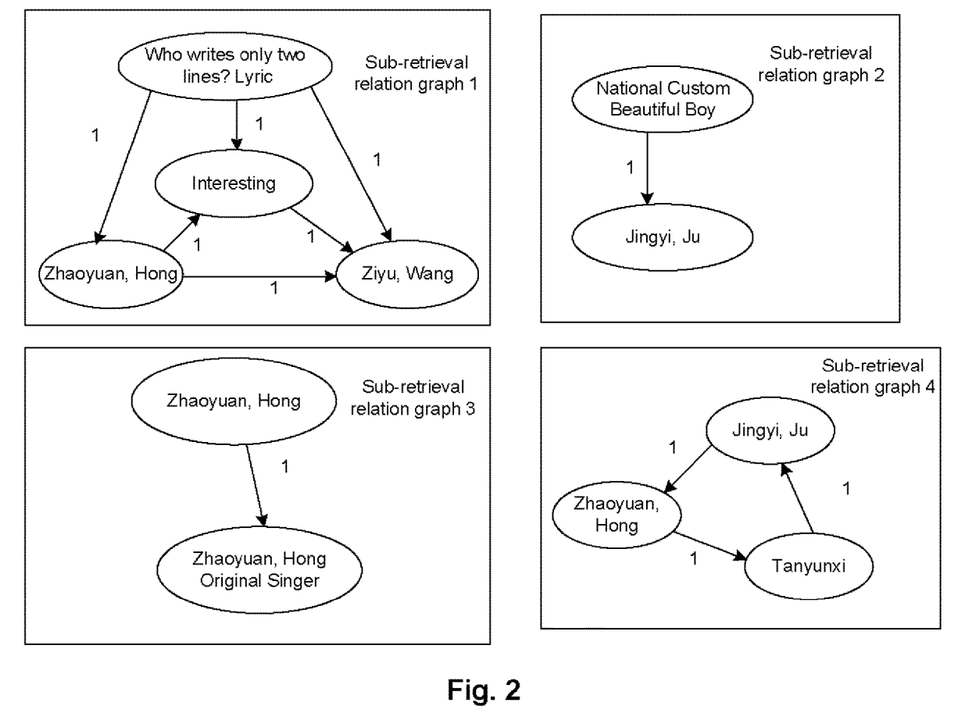
FIG. 2 is a schematic diagram of determining each sub-retrieval relation graph according to an optional embodiment of the present disclosure.

It is assumed that the edge weight is set to a constant of 1, that is, when $v(q_i, q_j)=1$, the four sub-retrieval relation graphs shown in FIG. 2 may be obtained. FIG. 2 is a schematic diagram of determining each sub-retrieval relation graph according to an optional embodiment of the present disclosure. A sub-retrieval relation graph 1, a sub-retrieval relation graph 2, a sub-retrieval relation graph 3, and a sub-retrieval relation graph 4 are included.

Figure 3:
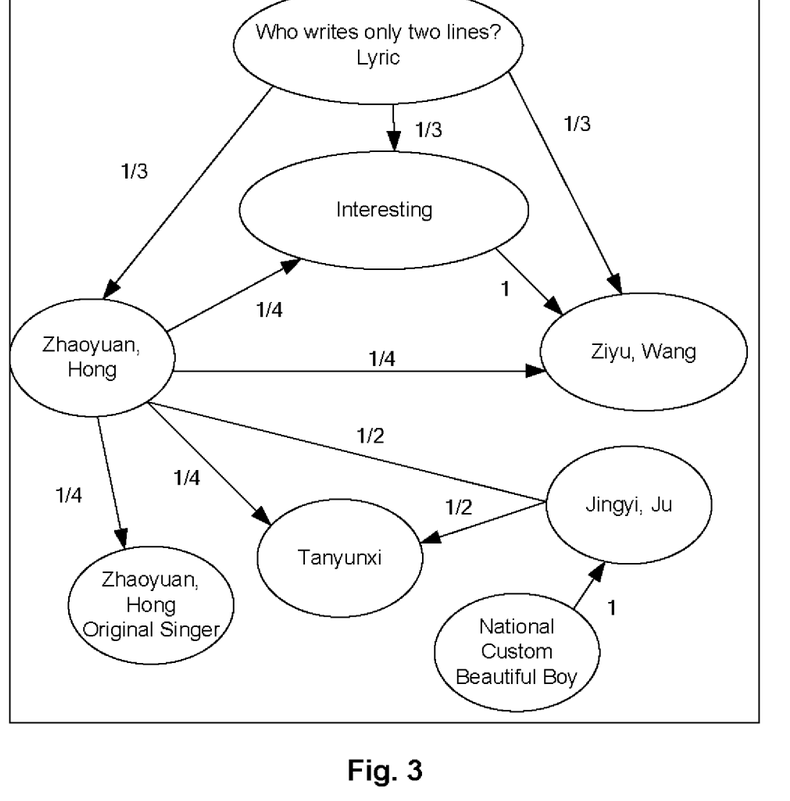
FIG. 3 is a schematic diagram of determining a retrieval relation graph according to an optional embodiment of the present disclosure.

The four sub-retrieval relation graphs shown in FIG. 2 are combined and normalized to obtain the retrieval relation graph. FIG. 3 is a schematic diagram of determining a retrieval relation graph according to an optional embodiment of the present disclosure.

For the retrieval relation graph shown in FIG. 3, the weight of each query obtained by applying the PageRank algorithm is shown in Table 1 below:

TABLE 1

| Query | Weight |
|---|---|
| Who writes only two lines? | 0.007 |
| Zhaoyuan, Hong | 0.126 |
| Interesting | 0.116 |
| Ziyu, Wang | 0.136 |
| Zhaoyuan, Hong Original Singer | 0.176 |
| Jingyi, Ju | 0.129 |
| National Custom Beautiful Boy | 0.007 |

When a user searches for "Zhaoyuan, Hong", according to a query relation graph and by means of the weight value of each query, a related search list may be obtained in an order of four queries namely "Zhaoyuan, Hong Original Singer", "Tanyunxi", "Ziyu, Wang", and "Interesting".

By means of the above embodiments, in making related recommendations, a relationship between a search behavior sequence of the user and the intention of the user is considered, a historical search behavior sequence is used for obtaining true search intentions of historical users, and true search intentions of new users when searching for a query are inferred according to these historical behaviors, thereby shortening the search path of users, and improving user experience.

The present disclosure is described below through another optional information recommendation apparatus.

Figure 4:
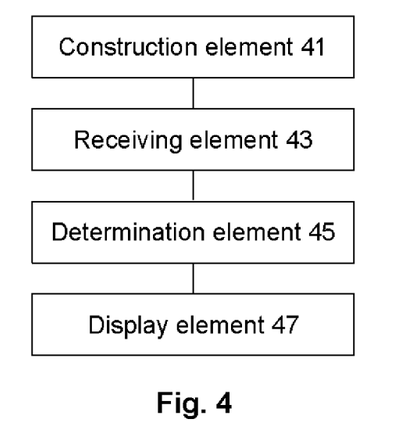
FIG. 4 is a schematic diagram of an optional information recommendation apparatus according to an embodiment of the present disclosure.

FIG. 4 is a schematic diagram of an information recommendation apparatus according to an optional embodiment of the present disclosure. As shown in FIG. 4, the information recommendation apparatus may include: a construction element 41, a receiving element 43, a determination element 45, and a display element 47.

The construction element 41 is configured to construct a retrieval relation graph, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search.

The receiving element 43 is configured to receive target keywords to be retrieved. The determination element 45 is configured to query linked page nodes corresponding to the target keywords and a weight value of each linked page node from the retrieval relation graph to determine a target search list, where the target search list includes multiple recommendation information sorted by weight values.

The display element 47 is configured to display the target search list.

By means of the information recommendation apparatus, a retrieval relation graph is first constructed by the construction element 41, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search; target keywords to be retrieved are received by the receiving element 43; then, linked page nodes corresponding to the target keywords and a weight value of each linked page node are queried from the retrieval relation graph to determine a target search list by the determination element 45, and the target search list includes multiple recommendation information sorted by weight values; and finally, the target search list may be displayed by the display element 47. In this embodiment, according to the same understanding of a user for a certain field, in making related search recommendations, a relationship between a search behavior sequence of the user and the intention of the user is considered, a historical search behavior sequence is used to obtain true search intentions of historical users, and true search intentions of new users when searching for a query are inferred according to these historical behaviors, thereby shortening the search path of users, and improving user experience. Moreover, a weight value is used to determine a search list to be recommended, so that users can view the most wanted information, so as to solve the technical problem of the large recommendation error due to the fact that the search intention of the user cannot be accurately captured during information recommendation in the related art.

Optionally, the construction element includes: a first acquisition component, configured to acquire historical search information, and the historical search information records session control sheets corresponding to each user from the start of the search to the end of the search during a history process; a first extraction component, configured to extract each session control sheet from the historical search information to determine the multiple sub-retrieval relation graphs; a synthesizing component, configured to synthesize the multiple sub-retrieval relation graphs to obtain a sub-retrieval relation graph set; and a first combination component, configured to combine, according to an association of keywords, the multiple sub-retrieval relation graphs in the sub-retrieval relation graph set to obtain the retrieval relation graph.

Optionally, the first extraction component includes: a first extraction sub-component, configured to extract search keywords and clicked pages recorded from the start of the search to the end of the search in each of the session control sheets; a first establishment sub-component, configured to establish, with a time series as a reference, a directed edge between the search keywords, and assign a link identifier of a clicked page corresponding to each search keyword; and a second establishment sub-component, configured to establish each sub-retrieval relation graph by using the directed edges and the link identifiers to obtain the multiple sub-retrieval relation graphs.

Optionally, the first extraction component further includes: a first determination sub-component, configured to determine a start time point and an end time point of each session control sheet, and an initial search keyword corresponding to the start time point and an end search keyword corresponding to the end time point; and a cutting sub-component, configured to cut each session control sheet in the historical search information according to the initial search keyword and the end search keyword.

In some embodiments of the present disclosure, the first combination component includes: a second determination sub-component, configured to determine each directed edge of each sub-retrieval relation graph, and de-duplicate the directed edges to obtain the processed directed edges; a first combination sub-component, configured to combine the processed directed edges according to the association of keywords to obtain the combined directed edges; and a normalization component, configured to normalize the combined directed edges to obtain the retrieval relation graph.

Optionally, the information recommendation apparatus further includes: a preprocessing element, configured to preprocess, after constructing a retrieval relation graph, a weight of each search keyword by a preset page ranking algorithm, where the preset page ranking algorithm at least includes: a PageRank algorithm; and a first determination component, configured to determine the weight value of each linked page node according to the weight of each search keyword and a content of a linked page.

Optionally, the determination element is configured to: search for linked page nodes corresponding to the target keywords from the retrieval relation graph; query a weight value of each linked page node; sort the linked page nodes corresponding to the target keywords according to the weight value of each linked page node; and recommended keywords, or recommended sentences, or query recommended keywords and recommended sentences corresponding to each linked page node to obtain the recommended information, so as to determine the target search list.

The information recommendation apparatus may further include a processor and a memory. The construction element 41, the receiving element 43, the determination element 45, the display element 47 and the like are stored in the memory as program elements, and the processor executes the program elements stored in the memory to implement corresponding functions.

The processor includes a kernel, and the kernel retrieves the corresponding program element from the memory. There may be at least one kernel, and at least one kernel parameter is adjusted to recommend keywords that are suitable for the search intentions of users.

The memory may include a non-persistent memory, a Random Access Memory (RAM), and/or non-volatile memory in a computer-readable medium, such as a Read-Only Memory (ROM) or flash memory (flash RAM). The memory includes at least one memory chip.

In another embodiment of the present disclosure, an electronic device is also provided, which includes: a processor; and a memory, configured to store an executable instruction of the processor, and the processor is configured to perform the information recommendation method as mentioned above by executing the executable instruction.

In another aspect of the embodiment of the present disclosure, a storage medium is also provided, which includes a stored program, and when running the stored program, a device where the storage medium is located is controlled to perform the information recommendation method as mentioned above.

The application also provides a computer program product, which, when executed on a data processing device, is suitable for executing a program initialized with the following method steps: a retrieval relation graph is first constructed, the retrieval relation graph includes multiple sub-retrieval relation graphs corresponding to search results obtained by using different keywords, each sub-retrieval relation graph includes at least one connected directed edge and the at least one connected directed edge is configured to indicate a linked page node obtained by keyword search; target keywords to be retrieved are received; linked page nodes corresponding to the target keywords and a weight value of each linked page node are queried from the retrieval relation graph to determine a target search list, and the target search list includes multiple recommendation information sorted by weight values; and the target search list is displayed.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the application, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or of the elements may be selected according to actual needs to achieve the purpose of the solution of the present embodiment.

In addition, each functional element in each embodiment of the present disclosure may be integrated into a processing element, each element may also physically exist independently, and at least two elements may also be integrated into an element. The integrated element may be implemented in a hardware form and may also be implemented in form of software functional element.

The integrated element may be stored in a computer-readable storage medium when being implemented in the form of a software functional element and sold or used as a standalone product. According to such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

INDUSTRIAL APPLICABILITY

The solution provided in the embodiments of the application may be used for searching for a recommendation result. The technical solution provided in the embodiments of the application may be applied to an Internet search engine. According to the same understanding of a user for a certain field, in making related search recommendations, a relationship between a search behavior sequence of the user and the intention of the user is considered, a historical search behavior sequence is used to obtain true search intentions of historical users, and true search intentions of new users when searching for a query are inferred according to these historical behaviors, thereby shortening the search path of users, and improving user experience. Moreover, a weight value is used for determining a search list to be recommended, so that users can view the most wanted information, so as to solve the technical problem of a large recommendation error due to the fact that the search intention of a user cannot be accurately captured during information recommendation in the related art. In some embodiments of the present disclosure, linked page nodes corresponding to the target keywords and a weight value of each linked page node may be queried from the retrieval relation graph to determine a target search list, and the most accurate search results may be recommended to users more quickly, thereby improving the search efficiency.

What is claimed is:

1. An information recommendation method, comprising:
constructing a retrieval relation graph, wherein the retrieval relation graph comprises a plurality of sub-retrieval relation graphs corresponding to search results obtained by using different keywords, each sub-retrieval relation graph comprises at least one connected directed edge and the at least one connected directed edge is configured to indicate a linked page node obtained by keyword search, wherein constructing the retrieval relation graph comprises:
    acquiring historical search information, wherein the historical search information records session control sheets corresponding to each user from the start of the search to the end of the search during a history process;
    extracting each session control sheet from the historical search information to determine the plurality of sub-retrieval relation graphs;
    synthesizing the plurality of sub-retrieval relation graphs to obtain a sub-retrieval relation graph set; and
    combining, according to an association of keywords, the plurality of sub-retrieval relation graphs in the sub-retrieval relation graph set to obtain the retrieval relation graph, comprises:
        determining each directed edge of each sub-retrieval relation graph;
        de-duplicating the determined directed edges to obtain the processed directed edges;
        combining the processed directed edges according to the association of keywords to obtain the combined directed edges; and
        normalizing the combined directed edges to obtain the retrieval relation graph;
receiving target keywords to be retrieved;
querying linked page nodes corresponding to the target keywords and a weight value of each linked page node from the retrieval relation graph to determine a target search list, wherein the target search list comprises a plurality of recommendation information sorted by weight values; and
displaying the target search list.

2. The method as claimed in claim 1, wherein extracting each session control sheet from the historical search information to determine the plurality of sub-retrieval relation graphs comprises:
extracting search keywords and clicked pages recorded from the start of the search to the end of the search in each session control sheet;
establishing, with a time series as a reference, a directed edge between the search keywords, and assigning a link identifier of a clicked page corresponding to each search keyword; and
establishing each sub-retrieval relation graph by using the directed edges and the link identifiers to obtain the plurality of sub-retrieval relation graphs.

3. The method as claimed in claim 1, wherein extracting each session control sheet from the historical search information comprises:
determining a start time point and an end time point of each session control sheet, and an initial search keyword corresponding to the start time point and an end search keyword corresponding to the end time point; and
cutting each session control sheet in the historical search information according to the initial search keyword and the end search keyword.

4. The method as claimed in claim 1, wherein after constructing the retrieval relation graph, the method further comprises:
preprocessing a weight of each search keyword by a preset page ranking algorithm, wherein the preset page ranking algorithm at least comprises: a PageRank algorithm; and
determining the weight value of each linked page node according to the weight of each search keyword and a content of a linked page.

5. The method as claimed in claim 1, wherein determining the target search list comprises:
searching for linked page nodes corresponding to the target keywords from the retrieval relation graph;
querying a weight value of each linked page node;
sorting the linked page nodes corresponding to the target keywords according to the weight value of each linked page node; and
querying recommended keywords, or recommended sentences, or recommended keywords and recommended sentences corresponding to each linked page node to obtain the recommended information, so as to determine the target search list.

6. An information recommendation apparatus, comprising:
- a processor;
- a memory, configured to store an executable instruction of the processor to perform:
- constructing a retrieval relation graph, wherein the retrieval relation graph comprises a plurality of sub-retrieval relation graphs corresponding to search results obtained by using different keywords, and each sub-retrieval relation graph comprises at least one connected directed edge and the at least one connected directed edge is configured to indicate a linked page node obtained by keyword search, wherein constructing the retrieval relation graph comprises:
  - acquiring historical search information, wherein the historical search information records session control sheets corresponding to each user from the start of the search to the end of the search during a history process;
  - extracting each session control sheet from the historical search information to determine the plurality of sub-retrieval relation graphs;
  - synthesizing the plurality of sub-retrieval relation graphs to obtain a sub-retrieval relation graph set; and
  - combining, according to an association of keywords, the plurality of sub-retrieval relation graphs in the sub-retrieval relation graph set to obtain the retrieval relation graph, comprises:
    - determining each directed edge of each sub-retrieval relation graph;
    - de-duplicating the determined directed edges to obtain the processed directed edges;
    - combining the processed directed edges according to the association of keywords to obtain the combined directed edges; and
    - normalizing the combined directed edges to obtain the retrieval relation graph;
- receiving target keywords to be retrieved;
- querying linked page nodes corresponding to the target keywords and a weight value of each linked page node from the retrieval relation graph to determine a target search list, wherein the target search list comprises a plurality of recommendation information sorted by weight values; and
- displaying the target search list.

7. A non-transitory storage medium, comprising a stored program, wherein when running the stored program, a device where the storage medium is located is controlled to perform:
- constructing a retrieval relation graph, wherein the retrieval relation graph comprises a plurality of sub-retrieval relation graphs corresponding to search results obtained by using different keywords, each sub-retrieval relation graph comprises at least one connected directed edge and the at least one connected directed edge is configured to indicate a linked page node obtained by keyword search, wherein constructing the retrieval relation graph comprises:
  - acquiring historical search information, wherein the historical search information records session control sheets corresponding to each user from the start of the search to the end of the search during a history process;
  - extracting each session control sheet from the historical search information to determine the plurality of sub-retrieval relation graphs;
  - synthesizing the plurality of sub-retrieval relation graphs to obtain a sub-retrieval relation graph set; and
  - combining, according to an association of keywords, the plurality of sub-retrieval relation graphs in the sub-retrieval relation graph set to obtain the retrieval relation graph, comprises:
    - determining each directed edge of each sub-retrieval relation graph;
    - de-duplicating the determined directed edges to obtain the processed directed edges;
    - combining the processed directed edges according to the association of keywords to obtain the combined directed edges; and
    - normalizing the combined directed edges to obtain the retrieval relation graph;
- receiving target keywords to be retrieved;
- querying linked page nodes corresponding to the target keywords and a weight value of each linked page node from the retrieval relation graph to determine a target search list, wherein the target search list comprises a plurality of recommendation information sorted by weight values; and
- displaying the target search list.

* * * * *